Oct. 28, 1924.
O. A. LUDWIG
RESILIENT WHEEL
Filed Nov. 22, 1923
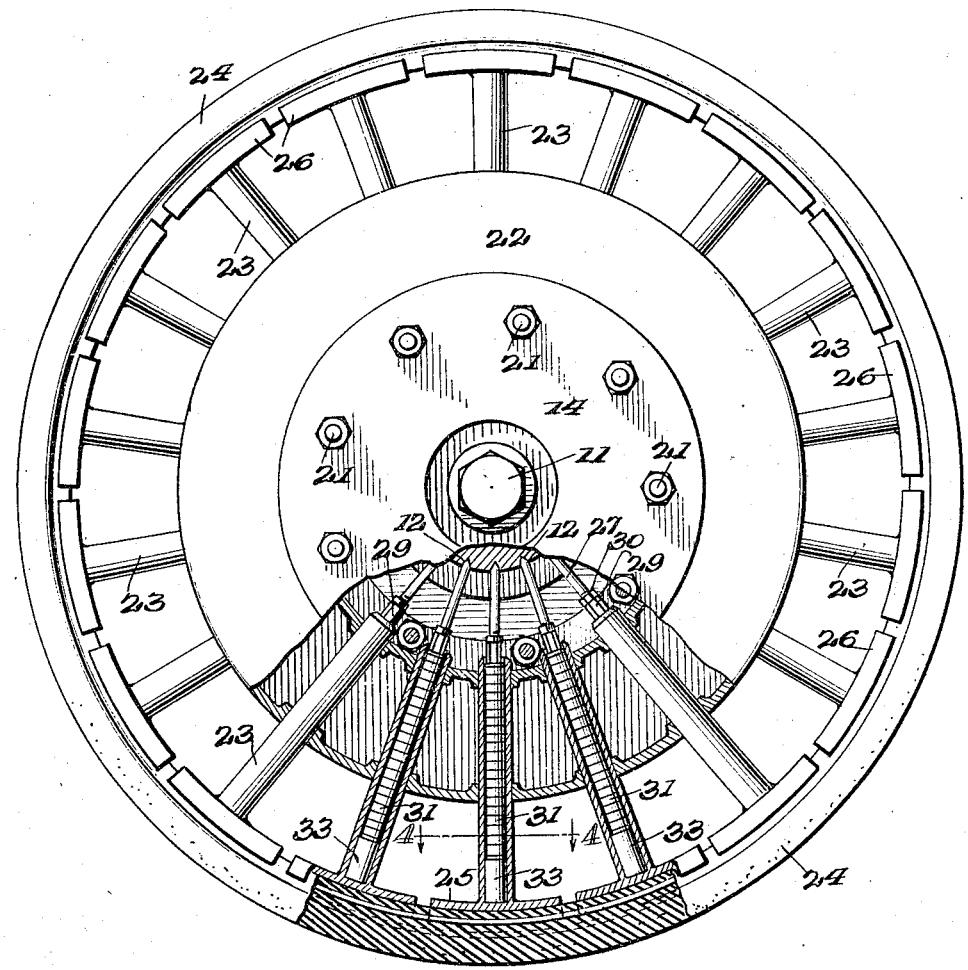
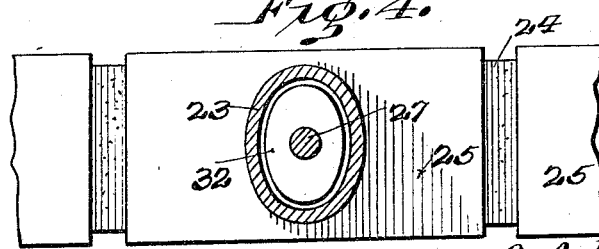
INVENTOR
O. A. Ludwig
BY
ATTORNEYS

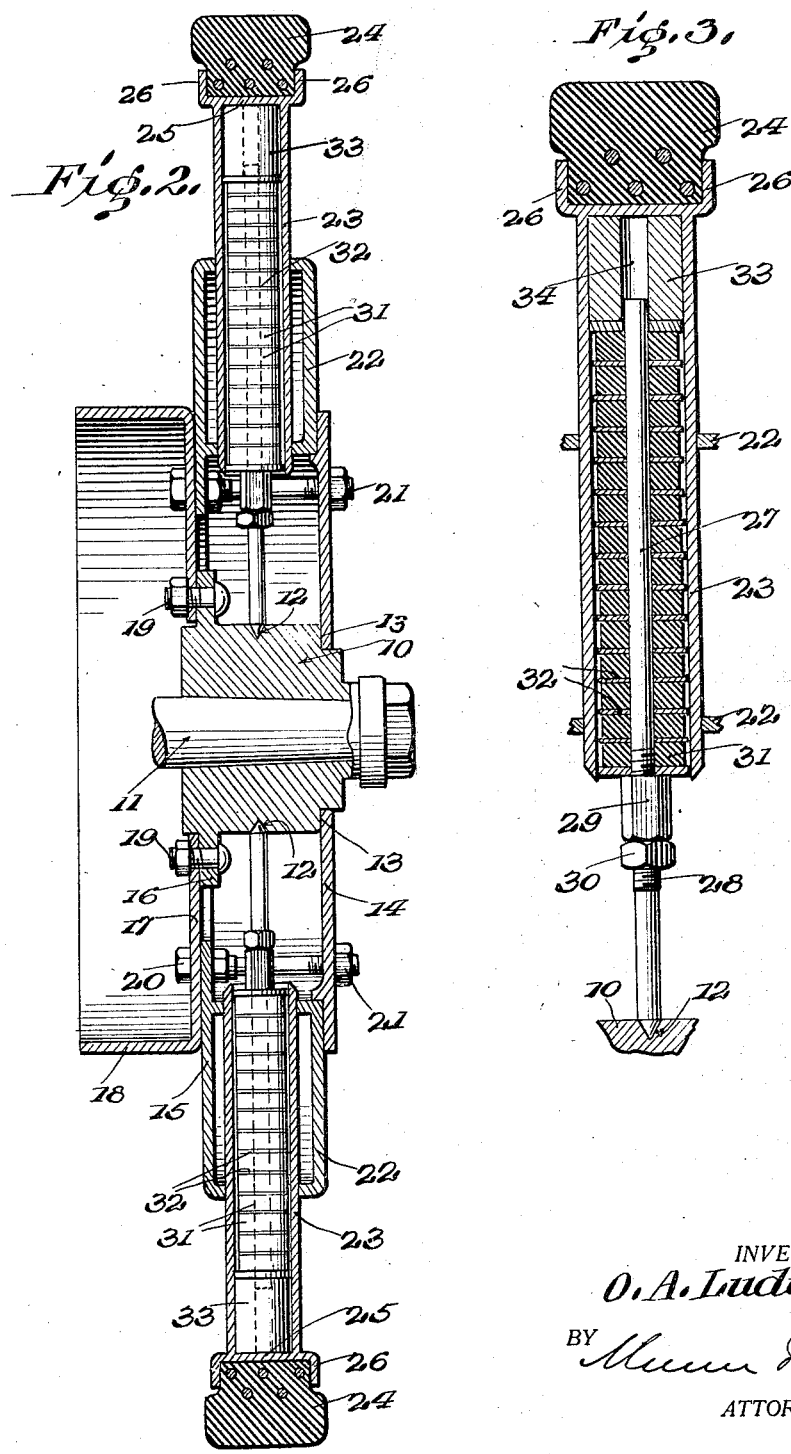

Patented Oct. 28, 1924.

1,513,175

UNITED STATES PATENT OFFICE.

OTTO A. LUDWIG, OF GREAT FALLS, MONTANA, ASSIGNOR TO LUDWIG RESILIENT WHEEL COMPANY, OF GREAT FALLS, MONTANA.

RESILIENT WHEEL.

Application filed November 22, 1923. Serial No. 676,407.

*To all whom it may concern:*

Be it known that I, OTTO A. LUDWIG, a citizen of the United States, and a resident of Great Falls, in the county of Cascade and State of Montana, have invented certain new and useful Improvements in Resilient Wheels, of which the following is a specification.

My present invention relates generally to resilient wheels and has for its primary object the provision of a wheel construction whereby resilient support of a vehicle may be accomplished without the use of a pneumatic tire, and a further object is the provision of a wheel adaptable to solid tires of various forms which obviates the necessity of springs and other delicate metallic parts having the disadvantages of ready distortion and breakage.

In the accompanying drawings which illustrate my present invention and form a part of this specification,—

Figure 1 is a side view, partly in elevation and partly broken away and in section, Figure 2 is an enlarged section taken diametrically through the wheel, Figure 3 is another enlarged section taken radially of the wheel, and Figure 4 is a detail cross section, on an enlarged scale, taken on line 4—4 of Figure 1.

Referring now to these figures my improved wheel essentially comprises a hub 10 which as to its axial structure providing for the reception of a shaft spindle such as indicated at 11 may be of various constructions and which is provided according to my invention with a centrally disposed annular series of pockets 12 and has at its outer portion a circumferential groove forming an annular shoulder 13 within which groove and against which shoulder 13 the inner peripheral edge of an outer closure plate 14 seats.

At its inner portion the wheel has a side plate 15, which may be either connected directly at its inner portion to an inner annular rib 16 of the hub 10, or with said rib 16 through a clamping plate 17 the outer portion of the latter of which may be flanged as at 18 to form a brake drum, plate 17 being connected at its inner edge to the rib 16 by an annular series of bolts 19 and at its outer portion to the side plate 15 by an annular series of bolts 20, the latter of which are extended outwardly and adapted to project through openings in the outer closure plate 14 whereby upon the application of outer nuts 21 to the outer ends of the bolts 20, the closure plate 14 is connected in place.

The outer portion of the inner side plate 15 is provided with a laterally projecting annular casing 22 and the inner and outer annular walls of this casing 22, whose outer side forms with the closure plate 14 the outer side of the wheel, have radially alined openings forming bearings for and to movably receive the outer tubular sections 23 of the spokes.

The wheel rim adapted for the reception of a solid tire 24 of suitable construction is made up of a series of rim segments 25, each flanged as at 26 at its opposite sides or otherwise constructed for the convenient reception of the tire 24 and each preferably formed integral with the outer end of one of the tubular spoke sections 23.

As best shown in Figure 3, each of the tubular spoke sections 23 is open at its inner end and receives axially thereof the outer portion of its respective spoke stem 27 whose inner end is conically or otherwise formed to properly seat within one of the pockets 12 of the periphery of the hub 10. Each stem 27 is also threaded as at 28 intermediate its ends to receive an adjusting nut 29 and a lock nut 30, the former constituting a support for one end of the cushion which in the present instance and according to my invention is constituted by a series of alternating resilient rings 31 and inelastic metal washers 32, said series of alternating rings and washers being disposed around the outer portion of the stem 27 within the tubular section 23 of the spoke. The cushion member thus formed and having adjustable bearing as previously described at its inner end upon the adjusting nut 29 of the stem 27, has bearing at its outer end against a cylindrical bearing plug 33 disposed within the outer end of the respective spoke tube 23 and provided with an axial bore 34 within which the outer end of the stem 27 is movably seated and has bearing. This plug seats at its outer end against the inner surface of the respective rim segment 25 and thus it is obvious that in operation when any of the inwardly and radially shiftable rim segments are so moved in supporting the weight of a vehicle on which the wheel is mounted, the respective spoke tubes 23 will be shifted inwardly against the tension and cushioning action of the respective series of alternating resilient rings and their separating inelastic bearing washers, it being obvious that in their movement these spoke tubes will be effectively guided through the bearing apertures of the inner and outer annular walls of the casing 22, the latter rigidly connected to the hub 10.

It is also obvious that the effective pressure of the cushions with the several spokes, the latter of which are disposed radially in a more or less conventional manner, may be adjusted by manipulation of the adjustable bearing nuts 29 and that the latter may be locked in adjusted position by the lock nuts 30.

It will be apparent from the foregoing that my invention avoids the use of delicate springs and other readily distortable and breakable parts and that it is not only simple and inexpensive in the first instance but may be maintained with minimum cost of upkeep and will be effective and efficient in use.

I claim:

1. A resilient wheel including a rigid hub portion, a rigid spoke guide supported by the hub portion and having apertured bearing walls spaced apart and concentric with the hub, a rim consisting of a series of segments, and a series of spokes each of which includes an inner part projecting outwardly from the hub and an outer tubular part movable in said spoke bearings and supporting one of the rim segments at its outer end, and a cushion member disposed within the tubular outer part of each spoke around the outer portion of the inner part and having bearing at its opposite ends in connection with said spoke parts.

2. A resilient wheel including a rigid hub portion, a rigid spoke guide supported by the hub portion and having apertured bearing walls spaced apart and concentric with the hub, a rim consisting of a series of segments, and a series of spokes each of which includes an inner part projecting outwardly from the hub and an outer tubular part movable in said spoke bearings and supporting one of the rim segments at its outer end, and a cushion member disposed within the tubular outer part of each spoke around the outer portion of the inner part and having bearing at its opposite ends in connection with said spoke parts, said cushion including a series of alternating resilient rings and inelastic washers housed and protected by the spoke tubes at all times.

3. A resilient wheel including a rigid hub portion, a rigid spoke guide supported by the hub portion and having apertured bearing walls spaced apart and concentric with the hub, a rim consisting of a series of segments, and a series of spokes each of which includes an inner part projecting outwardly from the hub and an outer tubular part movable in said spoke bearings and supporting one of the rim segments at its outer end, and a cushion member disposed within the tubular outer part of each spoke around the outer portion of the inner part and having bearing at its opposite ends in connection with said spoke parts, said inner part of each spoke having adjustable means to control the effective pressure of each of the said cushion members.

4. A resilient wheel including a hub, a rim consisting of a series of segments, a rigid bearing member having spaced bearing plates intermediate the hub and rim and concentric therewith, a series of spokes, each having an inner stem disposed at its inner end in connection with the hub, and an outer tube rigid at its outer end with one of the rim segments and axially receiving the outer portion of the respective inner stem, each spoke tube having a bearing member therein for the outer end of the stem and each stem having an adjustably locked bearing nut, and a cushion member within each tube bearing at its outer end against the said bearing member of the tube and having bearing at its inner end against the said adjustable bearing member of the stem.

5. A resilient wheel including a hub, a rim consisting of a series of segments, a rigid bearing member having spaced bearing plates intermediate the hub and rim and concentric therewith, a series of spokes, each having an inner stem disposed at its inner end in connection with the hub, and an outer tube rigid at its outer end with one of the rim segments and axially receiving the outer portion of the respective inner stem, each spoke tube having a bearing member therein for the outer end of the stem and each stem having an adjustably locked bearing nut, and a cushion member within each tube bearing at its outer end against the said bearing member of the tube and having bearing at its inner end against the said adjustable bearing member of the stem, said cushion member including a series of alternating resilient rings and inelastic washers disposed around the outer portion of the stem and housed within the tube.

OTTO A. LUDWIG.